(12) United States Patent
Kim et al.

(10) Patent No.: US 11,322,003 B2
(45) Date of Patent: May 3, 2022

(54) INFORMATION OUTPUT DEVICE

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR)

(73) Assignee: Dot Incorporation, Seoul (KR)

( * ) Notice: Subject to any disclaimer, the term of this patent is extended or adjusted under 35 U.S.C. 154(b) by 0 days.

(21) Appl. No.: 17/115,438

(22) Filed: Dec. 8, 2020

(65) Prior Publication Data

US 2021/0090411 A1 Mar. 25, 2021

Related U.S. Application Data

(63) Continuation-in-part of application No. PCT/KR2019/006857, filed on Jun. 7, 2019.

(30) Foreign Application Priority Data

Jun. 8, 2018 (KR) .................. 10-2018-0066339

(51) Int. Cl.
*H04B 3/36* (2006.01)
*G08B 6/00* (2006.01)

(52) U.S. Cl.
CPC .................... *G08B 6/00* (2013.01)

(58) Field of Classification Search
CPC .. G08B 6/00; G06F 3/01; G06F 3/016; H02N 11/00; H02N 11/006
See application file for complete search history.

(56) References Cited

U.S. PATENT DOCUMENTS

| 5,449,292 | A | 9/1995 | Tani et al. | |
|---|---|---|---|---|
| 6,217,338 | B1 * | 4/2001 | Tieman | G09B 21/004 434/112 |
| 7,737,828 | B2 * | 6/2010 | Yang | G06F 3/016 340/407.1 |
| 8,740,618 | B2 * | 6/2014 | Shaw | G09B 21/004 434/113 |
| 9,734,731 | B2 * | 8/2017 | Van Hees | G09B 21/02 |

FOREIGN PATENT DOCUMENTS

| JP | 2005-266358 A | 9/2005 |
|---|---|---|
| KR | 10-2006-0027006 A | 3/2006 |
| KR | 10-2017-0066029 A | 6/2017 |
| KR | 10-2017-0071458 A | 6/2017 |
| KR | 20-0484372 Y1 | 8/2017 |
| KR | 10-2017-0135774 A | 12/2017 |

OTHER PUBLICATIONS

International Search Report and Written Opinion dated Sep. 6, 2019 in International Application No. PCT/KR2019/006857, in 18 pages.

* cited by examiner

*Primary Examiner* — Toan N Pham
(74) *Attorney, Agent, or Firm* — Knobbe Martens Olson & Bear LLP

(57) ABSTRACT

This application relates to an information output device using a unit block module. Due to the use of the unit block module, apparatus of various sizes may be simply constructed and/or designed, durability and user convenience may be improved, waterproof properties are provided, power consumption is minimized, and an operation error of a driving module may be minimized. And, when a pin is driven down, the pin may be driven down more easily by the attraction of a magnetic material and a magnetic member.

18 Claims, 15 Drawing Sheets

INFORMATION OUTPUT DEVICE

CROSS REFERENCE TO RELATED APPLICATIONS

This application is a continuation-in part of International Patent Application No. PCT/KR2019/006857, filed on Jun. 7, 2019, which claims priority to Korean patent application No. 10-2018-0066339 filed on Jun. 8, 2018, contents of both of which are incorporated herein by reference in their entireties.

BACKGROUND

Technical Field

One or more embodiments of the disclosure relate to an information output device.

Description of Related Technology

Users may recognize information in a variety of ways. To this end, various types of information output apparatus are used.

For example, a visual information output apparatus using a printed material, and an acoustic information output apparatus using sound are used.

In particular, in modern times, information output apparatus including electronic technology is also frequently used in accordance with an increase of information amount and technological development, and a display device having a plurality of pixels is commonly used as a visual information output apparatus.

SUMMARY

Embodiments of the present disclosure provide a tactile implementation information output apparatus that is easy to assemble and design, and is simple to maintain.

In addition, embodiments of the present disclosure provide an information output apparatus that may improve durability and user convenience, and minimize power use.

An information output apparatus in accordance with An embodiment of the present disclosure may comprise at least one unit block module each including a plurality of expression holes, at least one first fastening part and at least one second fastening part provided in a form that may be coupled to the at least one first fastening part, a plurality of pins located in each of the at least one unit block module and moved to be exposed through the plurality of expression hole, a plurality of activation modules located in each of the at least one unit block module, moving the plurality of pins, and each including a coil, a control panel coupled to the at least one unit block module and including a plurality of terminals electrically connected to the coils of the plurality of activation modules and a control module electrically connected to the plurality of terminals and provided to control an operation of the plurality of activation modules.

The at least one unit block module includes a first unit block module and a second unit block module adjacent to each other, and a first fastening part of the first unit block module and a second fastening part of the second unit block module are coupled, and the first unit block module and the second unit block module may be coupled to the control panel.

Each of the at least one unit block module includes a housing having a first surface, a second surface and a third surface facing in different directions, and wherein the plurality of expression holes are located on the first surface, the first fastening part is located on the second surface, and the second fastening part may be located on the third surface.

Each of the plurality of activation modules may include a driving unit including the coil and a moving unit placed between the driving unit and the plurality of pins, including a magnetic member having a first polarity and a second polarity, and providing motion to the plurality of pins.

The information output device may further include a partition wall positioned between the driving unit and the moving unit.

The moving unit may be rotatably provided.

The magnetic member may be disposed at a position spaced apart from a center of the moving unit.

A rotation center of the moving unit may be arranged to be spaced apart from a center of rotation of the moving unit.

A rotation center of the moving unit may be provided to be movable.

The driving unit may further include a support projecting toward the moving unit.

Other aspects, features, and advantages than those described above will become apparent from the following drawings, claims, and detailed description of the disclosure.

An information output apparatus according to the embodiments of the present disclosure may easily configure and/or design various sized apparatus by using a unit block module.

The information output apparatus according to the embodiments of the present disclosure may be easily maintained when a specific unit block module fails.

The information output apparatus according to the embodiments of the present disclosure may improve durability and user convenience.

The information output apparatus according to the embodiments of the present disclosure may provide a waterproof function when a pin is exposed to a moisture environment.

The information output apparatus according to the embodiments of the present disclosure may reduce power consumption and enable low power operation.

The information output apparatus according to the embodiments of the present disclosure may minimize an operation error of a driving module.

The information output apparatus according to the embodiments of the present disclosure may maintain a position of the pin even when the voltage is not applied, so that an optimal tactile expression may be realized in a state in which power use is minimized.

DETAILED DESCRIPTION

Figure 1:
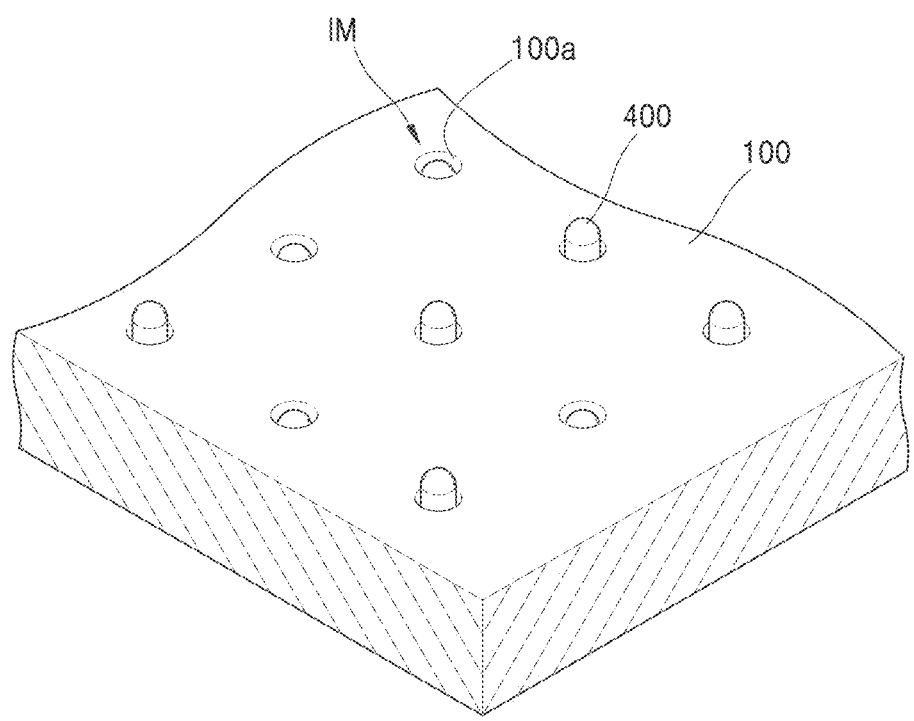
FIG. 1 is a perspective view schematically showing an information output apparatus according to an embodiment.

However, in the case of such a display device, various circuits are built in, so that manufacturing is not easy and control is inconvenient.

On the other hand, various forms of information output are required due to technological development and diversification of lifestyle.

For example, various information output apparatuses may be required according to a situation of each user, and in particular, when a user has a certain weakened sense, for example, when the user is visually impaired, it is necessary to output information through tactile sense.

To output information through the tactile sense, a pin needs to be driven. When a specific driving unit malfunctions, the entire device needs to be disassembled or replaced to repair the same. In addition, as the area of the device increases, there is a limitation that design and assembly become more difficult. In addition, in the case of the output of information through tactile sense, it is difficult to easily control and stably derive the same. Thus, there is a limitation in improving user's convenience through an improvement in information output apparatuses.

The embodiments may have various transformations, and specific embodiments are illustrated in the drawings and are described in detail in the detailed description. Effects and features of the embodiments, and methods of achieving them will be clarified through the following description in detail with reference to the drawings. However, the present disclosure is not limited to the embodiments disclosed below, but may be implemented in various forms.

The embodiments will be described below in more detail with reference to the accompanying drawings. Those components that are the same or are in correspondence are rendered the same reference numeral regardless of the figure number, and redundant explanations are omitted.

While such terms as "first," "second," etc., used in embodiments may be used to describe various components, such components must not be limited to the above terms. The above terms are used only to distinguish one component from another.

In all embodiments of the specification herein, a unit may denote a single component that executes a certain program, but embodiments of the present disclosure are not limited thereto, and may be a partitioned area of at least one storage medium storing the program.

In the following embodiments, an expression used in the singular encompasses the expression of the plural, unless it has a clearly different meaning in the context.

In the present specification, it is to be understood that the terms such as "including," "having," and "comprising" are intended to indicate the existence of the features or components disclosed in the specification, and are not intended to preclude the possibility that one or more other features or components may exist or may be added.

In the drawings, the size of components may be exaggerated or reduced for convenience of description. For example, since the size and thickness of each component shown in the drawings are arbitrarily shown for convenience of description, the following embodiments are not necessarily limited to those illustrated.

FIG. 1 is a perspective view schematically showing an information output apparatus according to an embodiment.

Referring to FIG. 1, an information output apparatus according to an embodiment may include an expression surface 100 having a plurality of first expression holes 100a. The expression surface 100 may include a flat surface as shown in FIG. 1.

At least one information output module IM is located inside the expression surface 100, and a pin 400 of each information output module IM may express a protruding signal on the expression surface 100 by entering and exiting the expression surface 100 through the first expression hole 100a. Such the protruding signal may constitute a variety of signal systems by the plurality of pins 400 selectively repeating entry and exit at the first expression hole 100a.

In the information output apparatus, the expression surface 100 may be formed to face a user. Therefore, the protruding signal by the selective entry and exit of the plurality of pins 400 exposed on the expression surface 100 may be recognized as a direct and local tactile sensation to the user, and the user may receive direct vibration in a position where the user receives tactile sensation from the plurality of pins 400. The protruding signal formed by such a direct and local tactile sensation may transmit an accurate signal to the user because residual vibration does not occur around the target, unlike a general vibration signal of portable electronic devices. Accordingly, a signal acquired through tactile sense such as braille may be implemented by the protruding signal as described above, and various other signals such as a military signal, a picture signal, a code signal, and a direction signal may be accurately implemented.

Figure 2:
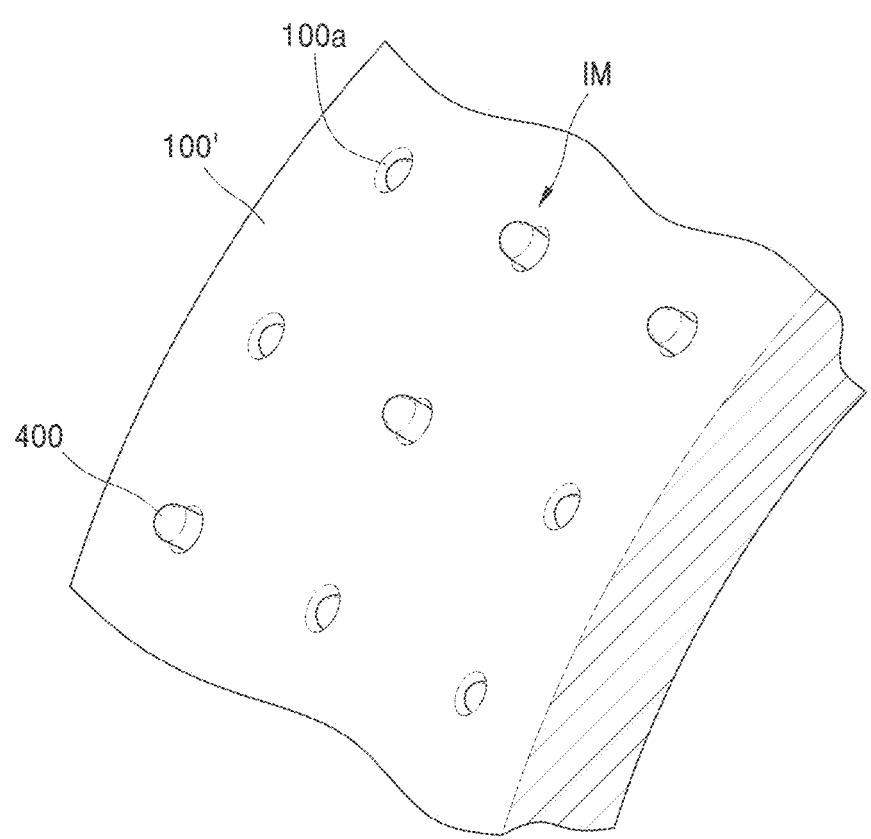
FIG. 2 is a perspective view schematically showing an information output apparatus according to another embodiment.

FIG. 2 is a perspective view schematically showing an information output apparatus according to another embodiment.

The information output apparatus according to the embodiment illustrated in FIG. 2 has an expression surface 100' including a curved surface. The expression surface 100' including such the curved surface also has a plurality of first expression holes 100a, and at least one information output module IM may be located inside a first expression hole 100a. Although the curved surface is shown in FIG. 2 as a surface having a single curvature, embodiments are not limited thereto, and the curved surface may include an irregular curved surface having a plurality of curvatures. In this case, an open direction of at least some of the plurality of first expression holes 100a may be different from each other, and accordingly, an entry direction of at least a portion of the plurality of pins 400 may also be different from each other.

Figure 3:
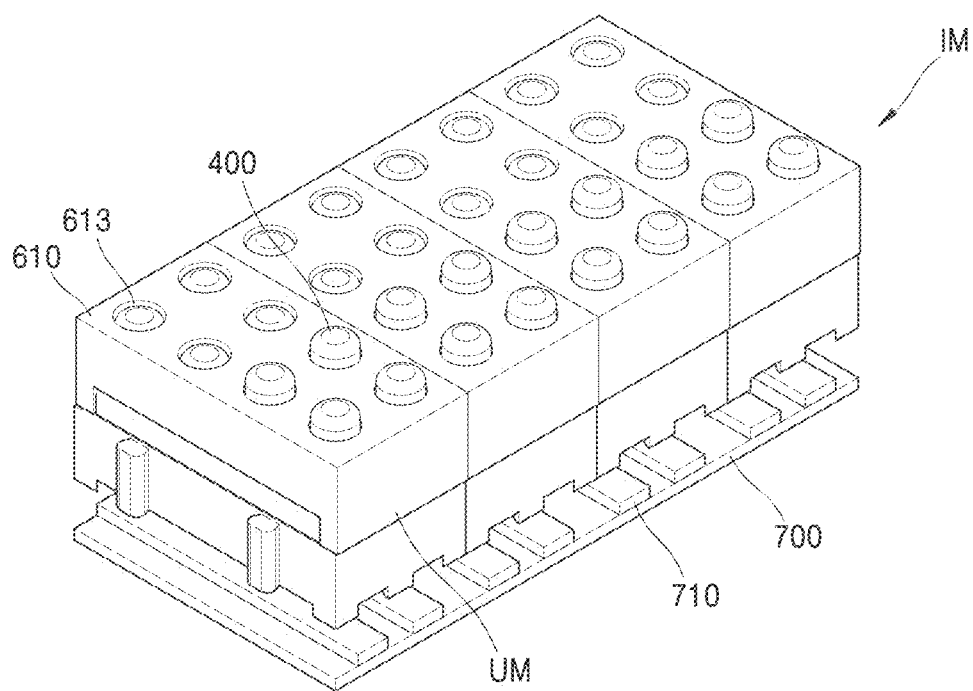
FIG. 3 is a configuration diagram schematically showing an information output module according to an embodiment.

As such, the information output apparatus according to the embodiments includes the at least one information output module IM, and FIG. 3 is a configuration diagram schematically showing the information output module IM according to an embodiment.

Referring to FIG. 3, an embodiment of the information output module IM may include at least one unit block module UM. According to the embodiment illustrated in FIG. 3, it is shown that the information output module IM include four unit block modules UM that are coupled together in a line. The present disclosure is not necessarily limited to this, and a plurality of unit block modules UM may be coupled in various directions.

The unit block module UM may include a plurality of second expression holes 613, and the second expression holes 613 may be aligned with the first expression holes on the expression surface. The plurality of pins 400 may selectively entry and exit through the second expression holes 613.

The information output module IM further includes a control plate 700.

The control plate 700 may include a circuit pattern, and may include a plurality of terminals 710 to be exposed at least to the outside. Each of the plurality of terminals 710 is electrically connected to an activation module located in the unit block module UM, and accordingly, an electrical signal may be applied to the activation module.

The plurality of unit block modules UM may be coupled to one control plate 700. However, the present disclosure is not limited to the embodiment in which one information output module IM includes one control plate 700. In an embodiment, one information output module IM may include a plurality of control plates 700.

Figure 4:
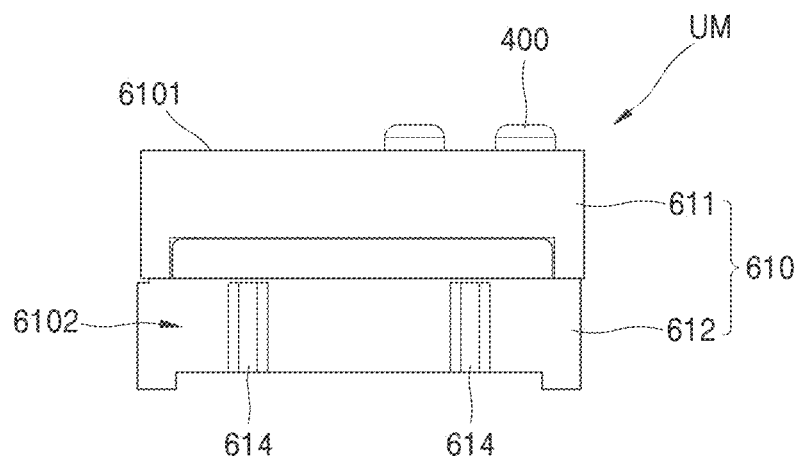
FIG. 4 is a view showing an aspect of a unit block module according to an embodiment.
Figure 5:
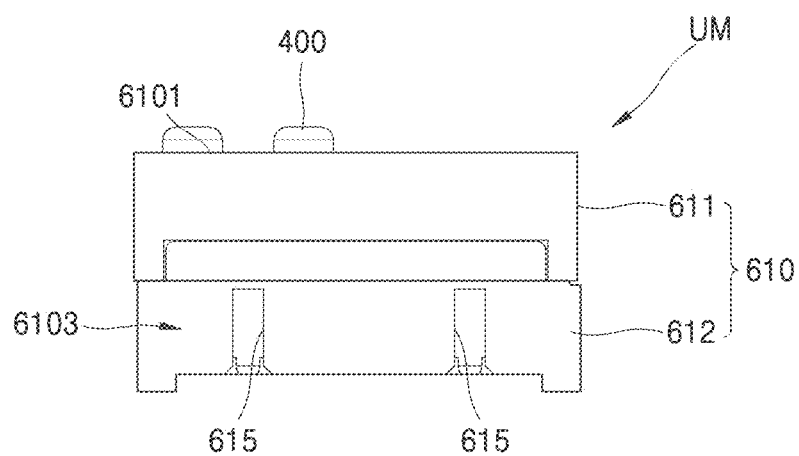
FIG. 5 is a view showing another aspect of a unit block module according to an embodiment.

The unit block module UM may include a housing 610 as shown in FIGS. 4 and 5.

According to an embodiment, the housing 610 may include a first housing 611 and a second housing 612 which are coupled to each other. The first housing 611 faces the expression surface, and the second housing 612 may be coupled to the control plate 700. Therefore, although not shown in the drawings, the first housing 611 may further include a coupling element that may be coupled to the inside of the expression surface, and the second housing 612 may further include a coupling element that may be coupled to the control plate 700.

The unit block module UM may be provided with a first fastening part 614 and a second fastening part 615 in the housing 610. The first fastening part 614 and the second fastening part 615 are provided to be fastened to each other, and are formed for the coupling to adjacent unit block modules. According to an embodiment, the first fastening part 614 may be at least one protrusion protruding outward. In addition, the second fastening part 615 may be at least one groove that is introduced inward to face the at least one protrusion. Therefore, the first fastening part and the second fastening part of adjacent unit block modules may be fastened to each other. The structures of the first fastening part 614 and the second fastening part 615 are not necessarily limited thereto, and various other types of fastening structures coupled to and fastened to each other may be applied.

According to an embodiment, the housing 610 may include a first surface 6101, a second surface 6102, and a third surface 6103 facing different directions. In this case, the first surface 6101 may be a surface facing an inner surface of the expression surface 100 of FIGS. 1 and 2, and the second surface 6102 and the third surface 6103 may each be a surface that extends perpendicular to the first surface 6101. According to FIGS. 4 and 5, the second surface 6102 and the third surface 6103 may be opposed to each other, but embodiments of the present disclosure are not limited thereto. In an embodiment, the second surface 6102 and the third surface 6103 may be disposed perpendicular to each other.

In the structure of the housing 610, the second expression hole 613 may be formed on the first surface 6101. Therefore, the pin 400 is selectively projected out of the housing 610 through the first surface 6101.

The second surface 6102 and the third surface 6103 may each be a surface facing an adjacent unit block module (UM). The first fastening part 614 may be located on the second surface 6102 and the second fastening part 615 may be located on the third surface 6103. Therefore, a first unit block module and a second unit block module adjacent to the first unit block module may be fastened in such a way that a first fastening part of the first unit block module and a second fastening part of the second unit block module are fastened to each other. At this time, the first surfaces of the adjacent unit block modules are connected to each other to form a flat surface.

In the present disclosure, the plurality of unit block modules UM are fastened in one direction, thereby constituting one information output module IM. When a braille display device is implemented, the unit block module UM may be a unit constituting one braille character, and to this end, may include pins 400 of 2×3 or 2×4. In addition, as a plurality of such unit block modules UM are connected, a pad implementing braille information with a plurality of pins 400 may be formed. According to the present disclosure, as described above, unit block modules UM are coupled to constitute the information output module IM. Thus, apparatuses of various sizes can be simply configured and/or designed and, when a specific unit block module UM malfunctions, the maintenance may be easily performed.

In the embodiment illustrated in FIG. 3, one information output module IM is configured by coupling a plurality of unit bock modules UMs, but embodiments are not limited thereto. In an embodiment, one unit block module UM may constitute one information output module IM. In this case, the first fastening part 614 and the second fastening part 615 of the unit block module UM are coupled to a casing of the apparatus and may fix the unit block module UM.

Optionally, in the information output module IM according to an embodiment, the first surface 6101 of the housing 610 constituting the unit block module UM may be the expression surface as described above. Therefore, in this case, the information output apparatus may be configured with the first surface 6101 exposed to the outside.

Figure 6:
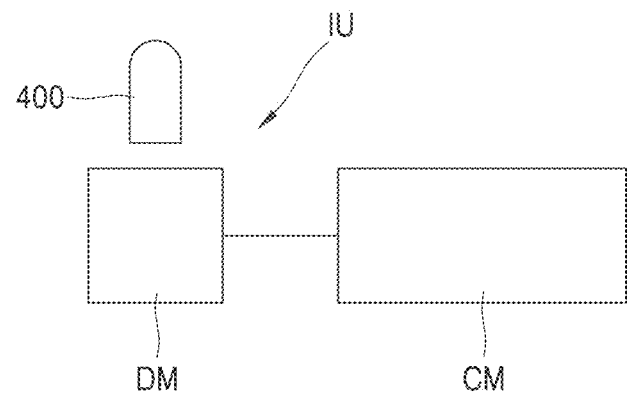
FIG. 6 is a configuration diagram schematically showing an information output unit according to an embodiment.

Each unit block module UM may include an information output unit IU as illustrated in FIG. 6 therein.

Each information output unit IU may include an activation module DM positioned opposite to the pin 400. The activation module DM may be electrically connected to the terminal 710 of the control plate 700, and the terminal 710 may be electrically connected to a control module CM. Therefore, the activation module DM may be electrically connected to the control module CM. The control module CM may control the operation of each activation module DM by transmitting a signal for protruding and entering the pin 400 to the activation module DM.

The activation module DM generates a driving force according to the signal of the control module CM and transmits the driving force to the pin 400, and various driving modules for protruding and entering the pin 400 may be applied.

Figure 7:
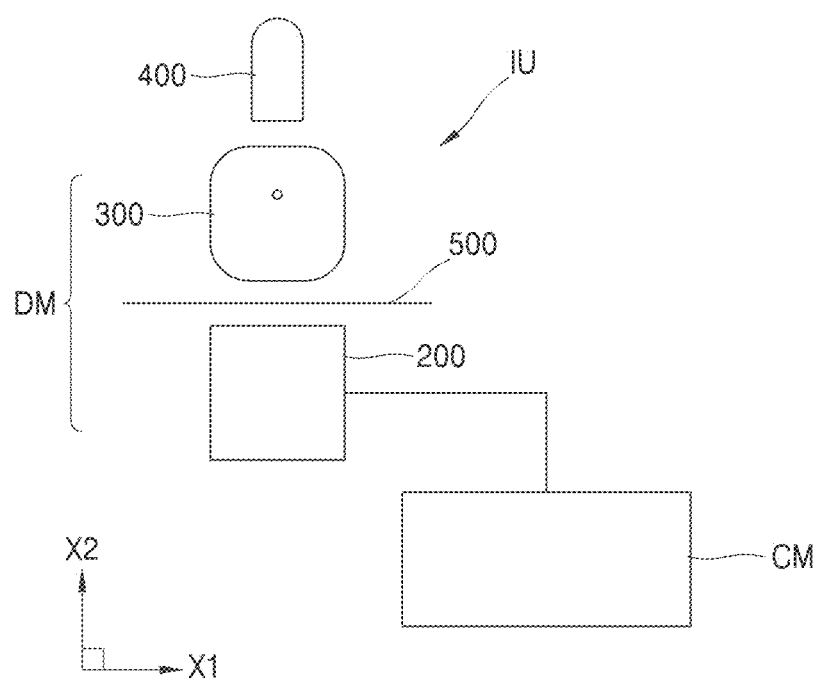
FIG. 7 is a configuration diagram schematically showing an information output unit according to another embodiment.

FIG. 7 schematically shows an embodiment of the activation module DM.

Referring to FIG. 7, the embodiment of the activation module DM may include a driving unit 200 and a moving unit 300.

The driving unit 200 may include a coil (not shown) electrically connected to the control module CM. The coil may be wound along a first direction X1, whereby a magnetic field may be formed in a second direction X2 as an electrical signal is applied from the control module CM. The driving unit 200 may be provided to maintain a fixed state thereof. The expression "electrically connected" does not necessarily mean a wired connection, but also means that an electrical signal may be transmitted by wireless communication, and includes a case in which another transmission medium exists between them. This may be applied equally to the embodiments of the present specification.

The moving unit 300 may be provided to move in response to an operation of the driving unit 200, more specifically, a magnetic field formed by a coil included in the driving unit 200. To this end, the moving unit 300 may include a magnet (not shown). The magnet has a first polarity and a second polarity opposite to the first polarity and thus, in response to the magnetic field formed by a coil, the magnet may move the moving unit 300 in the second direction X2. The movement of the moving unit 300 is transmitted to the pin 400, and thus, the protruding and entering movement of the pin 400 may be performed.

According to an embodiment, the moving unit 300 may be provided to perform a rotational movement, which may include movement in the second direction X2 as a result. The moving unit 300 may move depending on the movement of the driving unit 200, and thus may not be electrically connected to the control module CM.

The pin 400 is driven by the moving unit 300, and may move along the second direction.

According to an embodiment, the pin 400 may be in contact with the moving unit 300. In this case, since the moving unit 300 includes movement in the second direction X2, the pin 400 may selectively enter and exit through the expression hole along the second direction X2. The pin 400 may be coupled to the moving unit 300, but embodiments of the present disclosure are not limited thereto, and may include a transmission medium (not shown) for transferring physical motion between the moving unit 300 and the pin 400.

According to embodiments of the present disclosure, it is not necessarily limited thereto, and at least some of the pins 400 may be separated from the moving unit 300. In this case, the pin 400 may move in the second direction by being directly connected to the moving unit 300, or by being indirectly linked to the moving unit 300 via a separate link mechanism (not shown) or a motion transmission mechanism (not shown). The direction of movement of the pin 400 may include a second direction X2, and may be various directions including the first direction X1. In this case, the movement direction of the pin 400 may be an entry/exit direction for implementing the above-described protruding signal. The following description is based on the embodiment in which the pin 400 is coupled to the moving unit 300, but embodiments are not limited to this configuration. The following description may be applied to the embodiment in which the pin 400 is separated from the moving unit 300.

The second direction X2 may be a direction that is different from the first direction X1. According to the embodiment illustrated in FIG. 7, the second direction X2 may be perpendicular to the first direction X1.

Optionally, in order to prevent the pin 400 and/or the moving unit 300 from protruding outside the expression surface 100, when the location of the information output apparatus is changed, for example, when the information output apparatus is turned over, while the power is not applied to the driving unit 200, a separate device (not shown) may be placed between the pin 400 and the inside of the expression surface 100 and/or between the moving unit 300 and the inside of the expression surface 100. The device may be an elastic member and when the magnetic force of the driving unit 200 exceeds the elastic force of the elastic member, the pin 400 may protrude outside the expression surface 100. This embodiment may be applied to any embodiment of the present specification.

Meanwhile, as shown in FIG. 7, a partition wall 500 may be placed between the driving unit 200 and the moving unit 300, and the driving unit 200 and the moving unit 300 may be provided to be physically separated from each other by the partition wall 500. As the driving unit 200 and the moving unit 300 are physically separated, the driving unit 200 may be sealed from moisture, and even when the moving unit 300 is in an environment exposed to moisture, this environment may not affect the driving unit 200.

Figure 8:
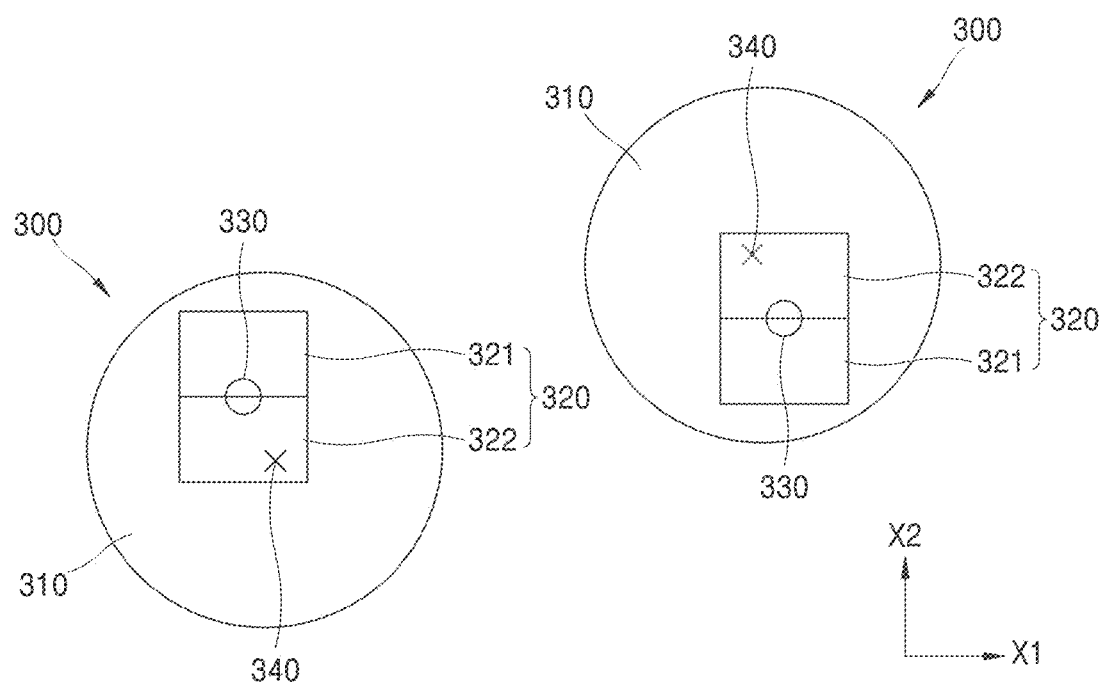
FIG. 8 is a view schematically showing an embodiment of a moving unit.

FIG. 8 is a cross-sectional view schematically showing an embodiment of the moving unit 300.

The moving unit 300 may include a body 310 rotatably provided, and the body 310 may be provided as a circular plate as shown in FIG. 8. However, the present disclosure is not necessarily limited thereto, and the body 310 may be formed in various shapes capable of transmitting power to a pin as the body 310 rotates around the rotation axis 330.

The body 310 of the moving unit 300 rotates around the rotation axis 330, and the rotation axis 330 may be spaced apart from the center of the moving unit 300, more specifically, the center 340 of the body 310. Accordingly, when the body 310 rotates around the rotation axis 330, an effect of moving in the second direction X2 as shown in the right image of FIG. 8 may be obtained. As the body 310 rotates and moves in the second direction X2, this movement is transmitted to the pin 400, and the pin 400 may also move in the second direction X2.

The moving unit 300 may include a magnetic member 320. Optionally, the magnetic member 320 may also be arranged to be spaced apart from the center of the moving unit 300, specifically, the center 340 of the body 310. Accordingly, when the body 310 of the moving unit 300 rotates under the influence of the magnetic field by the coil of the driving unit 200, it may be efficiently rotated with less force.

The magnetic member 320 may be embedded in the body 310, and a permanent magnet may be used. However, embodiments of the present disclosure are not limited thereto, and a magnetic body in which a N pole 321 and a S pole 322 are formed along the second direction X2 may be used.

Figure 9:
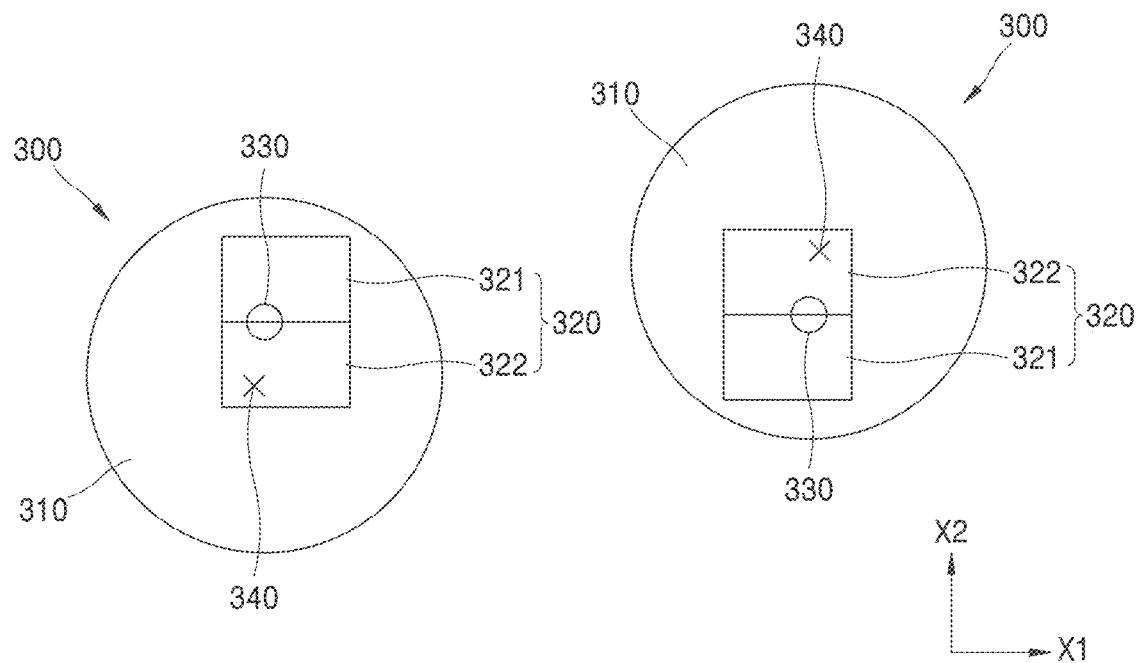
FIG. 9 is a view schematically showing another embodiment of a moving unit.

As shown in FIG 8, a center of the magnetic member 320 may be disposed at the same position as the rotation axis 330 of the body 310. However, embodiments are not limited thereto, and as in the embodiment illustrated in FIG. 9, the center of the magnetic member 320 may be spaced apart from the rotation axis 330 of the body 310. As such, a rotation efficiency of the body 310 may be maximized by adjusting a positional relationship of the rotation axis 330 of the body 310 and the center of the magnetic member 320.

Meanwhile, the rotation axis 330 of the body 310 may be formed in various shapes.

Figure 10:
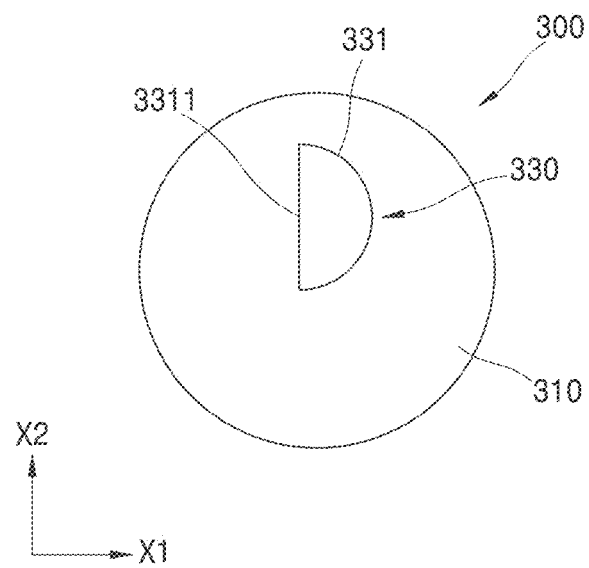
FIG. 10 is a view schematically showing another embodiment of a moving unit.

That is, as shown in FIG. 10, the rotation axis 330 may include a first rotation axis 331. The first rotation axis 331 may be formed in a semicircle shape and may include, for example, a straight portion 3311 extending along the second direction X2. The straight portion 3311 may be positioned close to a center of rotation.

Figure 11:
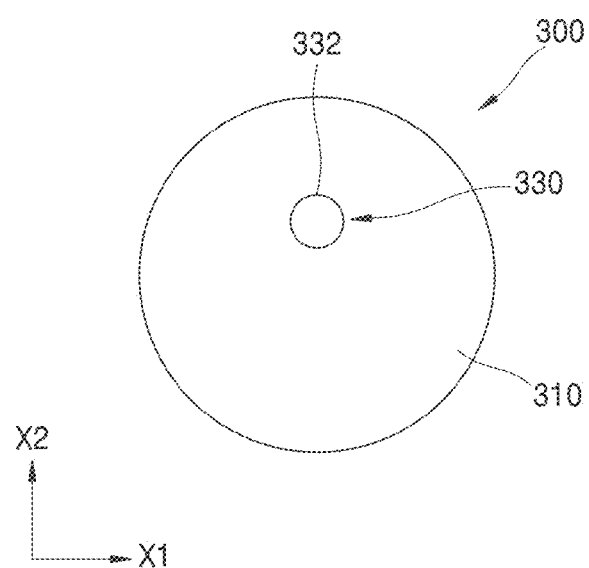
FIG. 11 is a view schematically showing another embodiment of a moving unit.

According to another embodiment illustrated in FIG. 11, the rotation axis 330 may include a second rotation axis 332. The second rotation axis 332 may be circular.

Figure 12:
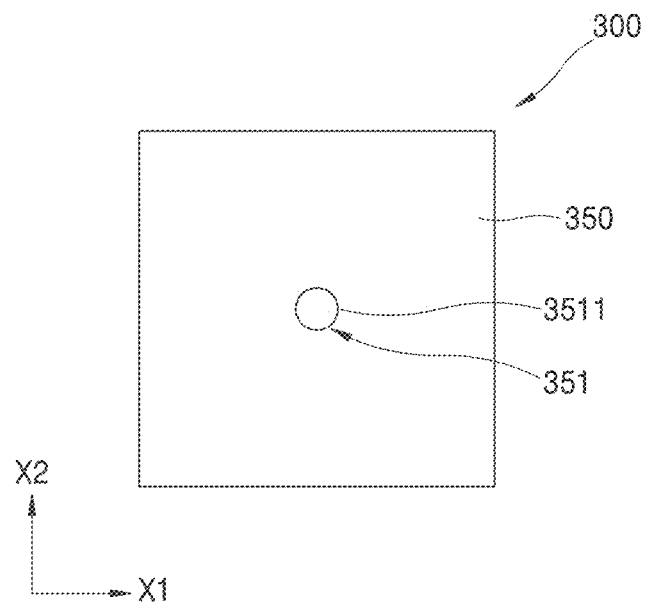
FIG. 12 is a view schematically showing an embodiment of a holder of a moving unit.

The body 310 may be mounted on a holder 350 shown in FIG. 12, the holder 350 may be formed as a box body, and the holder 350 may accommodate the body 310 therein, and may include a support groove 351 supporting the rotation axis 330 of the body 310. The holder 350 may have sufficient space therein so that the body 310 may rotate while the rotation axis 330 is supported on the support groove 351.

Figure 13:
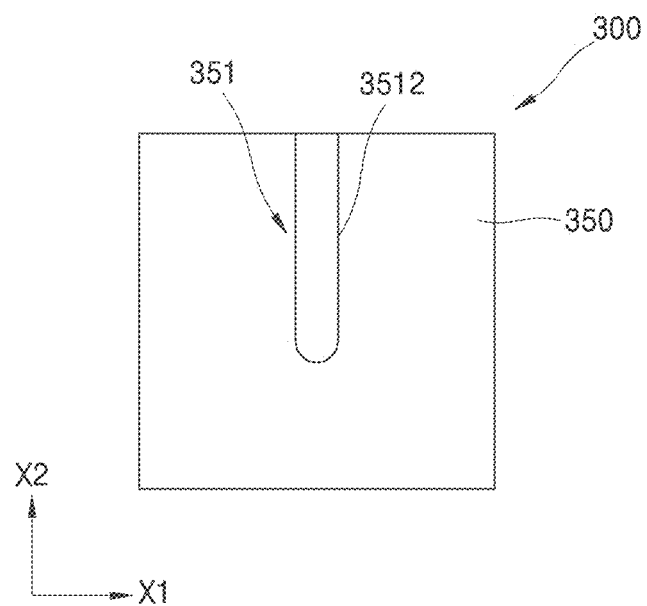
FIG. 13 is a view schematically showing another embodiment of a holder of a moving unit.

The support groove 351 may be formed in various shapes, and according to the embodiment illustrated in FIG. 13, the support groove 351 may include a first support groove 3511 provided in a circular shape. Accordingly, while the position of the rotation axis 330 mounted on the support groove 351 remains unchanged, the body may rotate.

According to another embodiment illustrated in FIG. 13, the support groove 351 may include a second support groove 3512. The second support groove 3512 may be formed in a straight line. The second support groove 3512 may extend along the second direction X2. Accordingly, the position of the rotation axis 330 mounted on the second support groove 3512 may move along the second direction X2. As the position of the rotation axis 330 moves along the second direction X2. the body 310 may move along the second direction X2 while rotating, whereby the body 310 may move the pin 400 with only a small force. In addition, as the body 310 moves toward the pin 400 while rotating along the second direction X2, the pin 400 may be maintained in a fixed state even when the coil is blocked with electricity.

Figure 14:
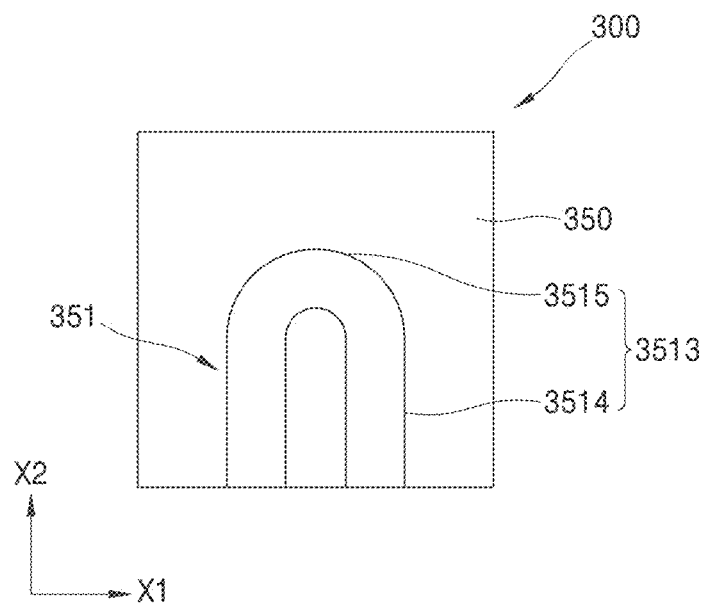
FIG. 14 is a view schematically showing another embodiment of a holder of a moving unit.

The straight shape may be provided in various shapes, and according to an embodiment illustrated in FIG. 14, the support groove 351 may include a third support groove 3513 provided in an inverted U shape. The third support groove 3513 may include a straight section 3514 and a curved section 3515. Accordingly, while the body 310 rotates, the rotation axis 330 of the body 310 may be moved from the straight section 3514 to the other straight section through the curved section 3515. Accordingly, in the state where the pin 400 is raised outside of the expression surface and the state where it is lowered inside of the expression surface, the distance between the magnetic member and the coil may be maintained constant, whereby the pin 400 may move with low power.

Various embodiments of the moving unit 300 as described above may be applied in combination to all embodiments of the present specification.

Figure 15:
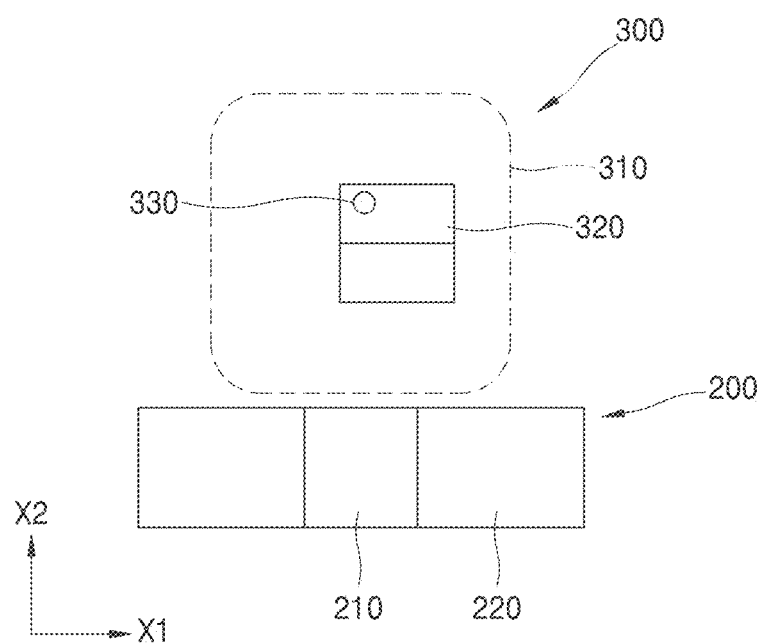
FIG. 15 is a view schematically showing an embodiment of a drive unit.

According to the embodiment illustrated in FIG. 15, the driving unit 200 may include a coil shaft 210 and a coil 220. The coil shaft 210 may be extended in the second direction X2, and the coil 220 may be wound around the coil shaft 210. Therefore, as the electrical signal is applied to the coil 220, the coil 220 may form a magnetic field along the second direction X2. The magnetic field may change the polarity of the magnetic phase in the second direction X2 according to the type of the electrical signal, and, as the magnetic member 320 reacts to the change in the magnetic polarity, the body 310 may rotate around the rotation axis 330.

In the case of the embodiment illustrated in FIG. 15, the coil 220 may be wound over the entire length of the coil shaft 210. However, embodiments are not limited thereto, and the coil 220 may be wound only on a part of the coil shaft 210. The coil shaft 210 may include a plastic material, but embodiments of the present disclosure are not limited thereto. In an embodiment, the coil shaft 210 may include a magnetic material such as metal. Accordingly, even when the application of electricity to the coil 220 is stopped, the magnetism may be maintained in the coil shaft 210 for a period of time.

Figure 16:
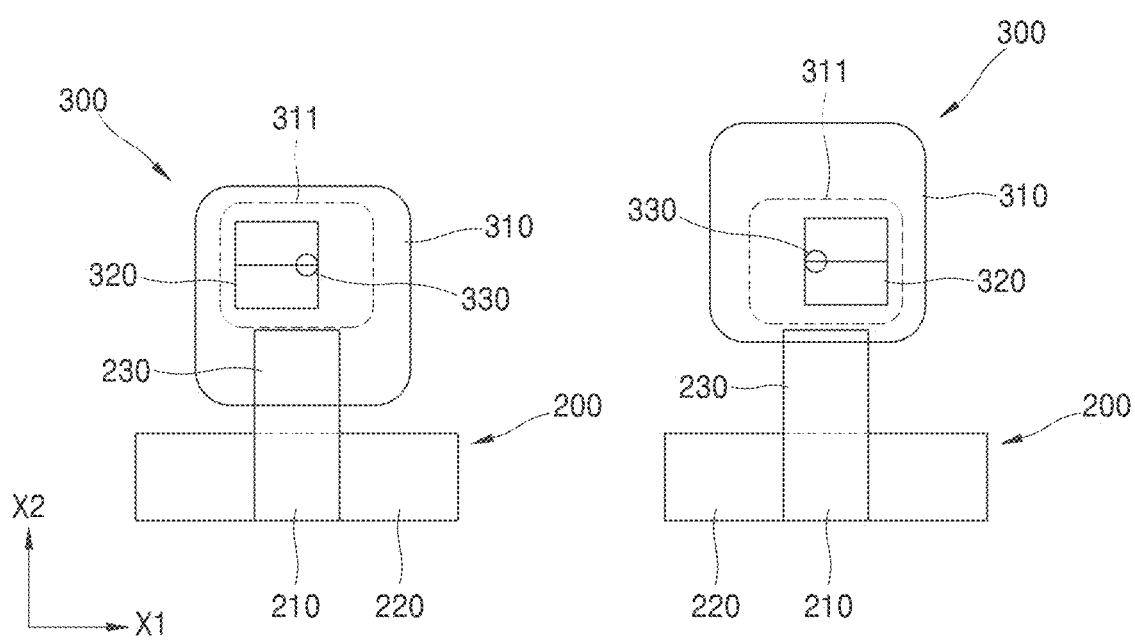
FIG. 16 is a view schematically showing another embodiment of a drive unit.

According to another embodiment illustrated in FIG. 16, the driving unit 200 may further include a support 230 protruding toward the moving unit 300. The support 230 may be coupled to the coil shaft 210 and may extend in the second direction X2, and when the coil shaft 210 includes a magnetic material, the coil shaft 210 and the support 230 may be integrally formed. However, embodiments are not limited thereto, and only the coil shaft 210 includes a magnetic material, and the support 230 may include a non-magnetic material.

Figure 17:
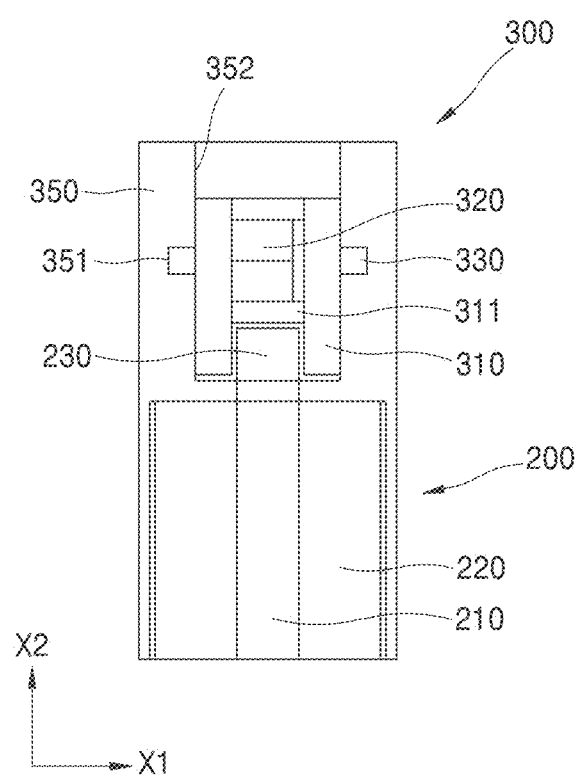
FIG. 17 is a view showing an embodiment of an assembly of a driving unit and a moving unit.

According to the embodiment illustrated in FIG. 16, the body 310 may include a receiving portion 311 in which the magnet member 320 is accommodated, and the receiving portion 311 may be formed to be spaced inwardly from the outer edge of the body 310. In addition, the support 230 may be provided to protrude up to the inside of the body 310 and extend to a position adjacent to the receiving portion 311. For example, as shown in FIG. 17, the receiving portion 311 is provided between a pair of body 310, so that, even when the support 230 is drawn to the inside of the body 310, the rotating of the body 310 may not interfere with the support 230. In this case, the holder 350 allows the body 310 to rotate sufficiently in the inner space portion 352. Thus, as the support 230 protrudes to the inside of the body 310 and extends to a position adjacent to the receiving portion 311, when the body 310 rotates, the support 230 supports the body 310 (for example, the receiving portion 311), whereby the body 310 may be stably rotated.

As the support 230 extends long, the distance between the support 230 and the magnetic member 330 may be maintained close. When the support 230 includes a magnetic material the support 230 has a certain polarity due to the magnetic force formed by the coil 220. Accordingly, even a small magnetic force may affect the magnetic member 330 more effectively. Therefore, it is possible to enable low-power driving. In addition, even in the case in which the electricity applied to the coil 220 is cut off, the support 230 may retain magnetism. Accordingly, the body 310 may maintain a fixed state without being reversed again even in a state as shown in the right figure of FIG. 16. Thus, the pin 400 may continue to protrude even when the power is not applied. Therefore, it is not necessary to continuously apply electricity to the coil 220 to keep the pin 400 protruding. This may lower the operating power and/or power consumption of the entire apparatus.

Figure 18:
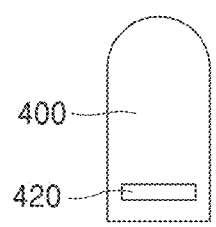
FIG. 18 is a view schematically showing another embodiment of a pin.

Meanwhile, as shown in FIG. 18, a magnetic material 420 may be further formed on the pin 400. The magnetic material 420 may be formed in a plate shape or a shape having a volume. In addition, although not shown in the drawings, the magnetic material may be coated in a film shape on the pin 400, or may be mixed when the pin 400 is formed.

As described above, since the pin 400 includes the magnetic material 420, the pin 400 may be prevented from protruding outside of the expression surface even when power is not applied. When the pin 400 protrudes to the outside of the expression surface and then is driven down to the inside of the expression surface again, the pin 400 may be driven down more easily by the magnetic force of the magnetic material 420 and the magnetic member 320 as well as the movement by the weight of the pin 400.

In this way, since the pin is easily driven down and the protrusion of the pin is prevented without applying power, low-power driving of the entire apparatus becomes possible.

Figure 19A:
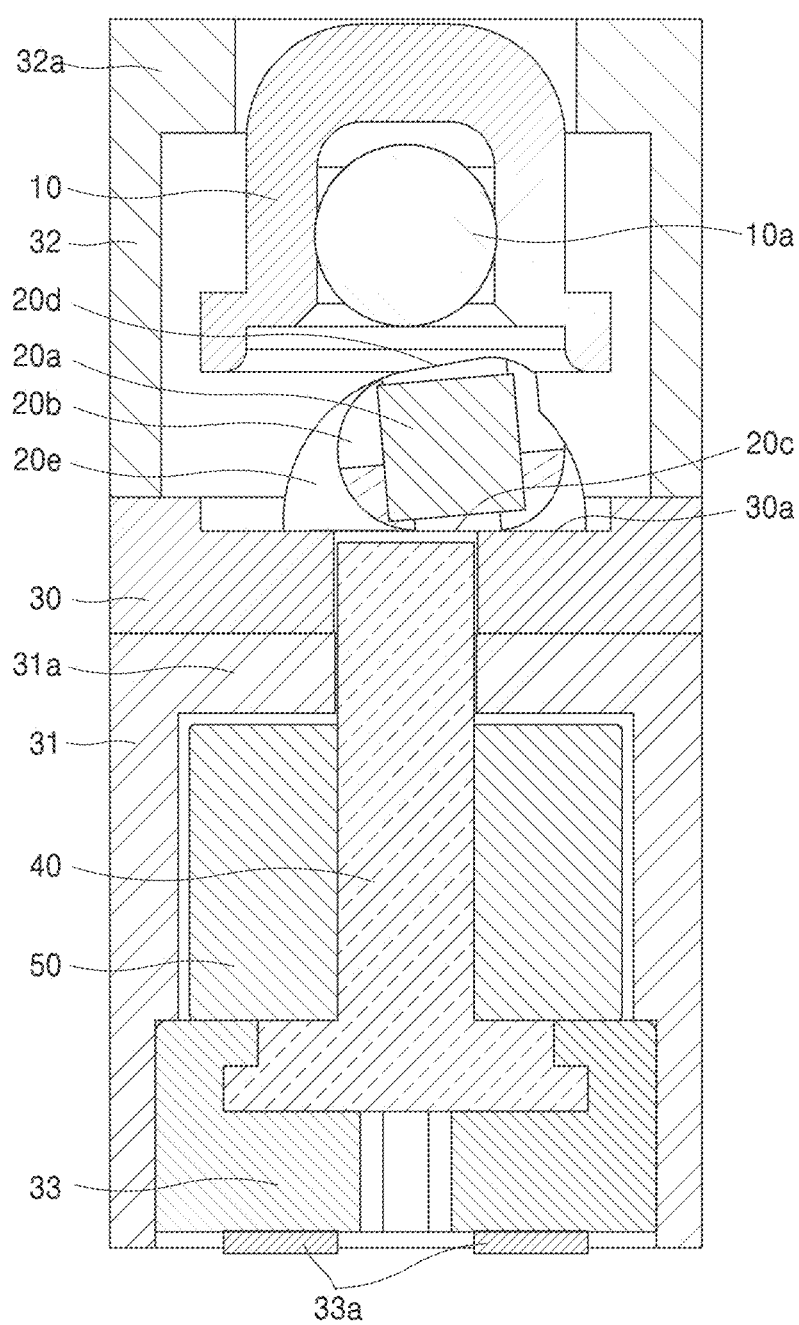
FIGS. 19A and 19B show sectional views of the information output unit according to another embodiment of the disclosure in a pin down state.
Figure 19B:
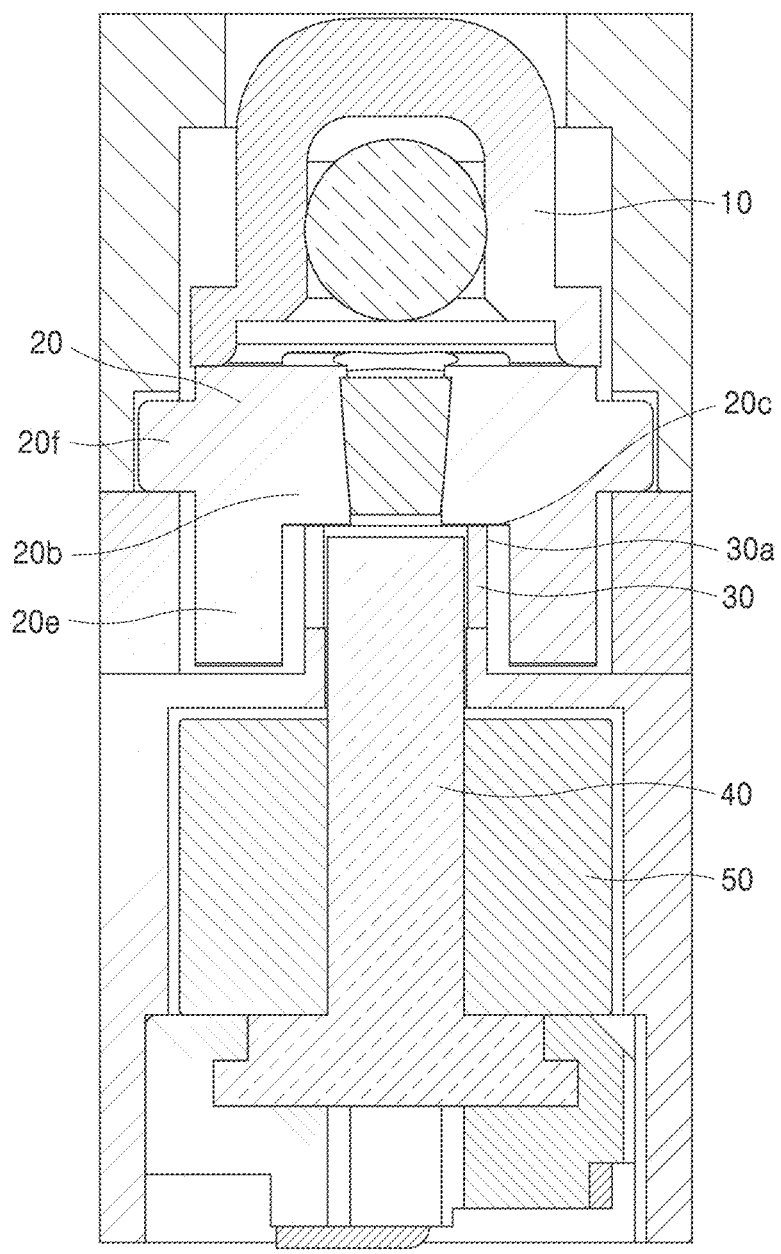
Figure 20A:
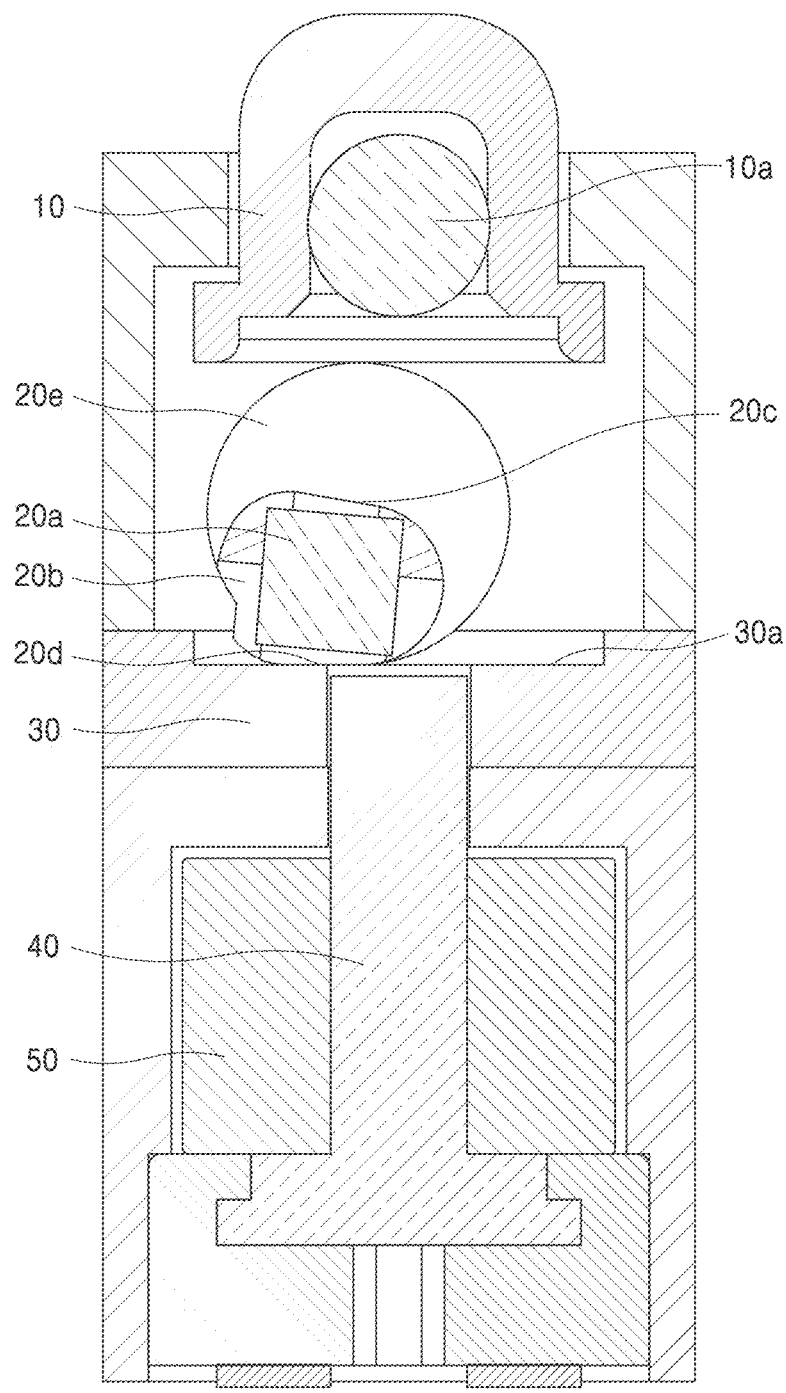
FIGS. 20A and 20B show sectional views of the information output unit according to another embodiment of the disclosure in a pin up state.
Figure 20B:
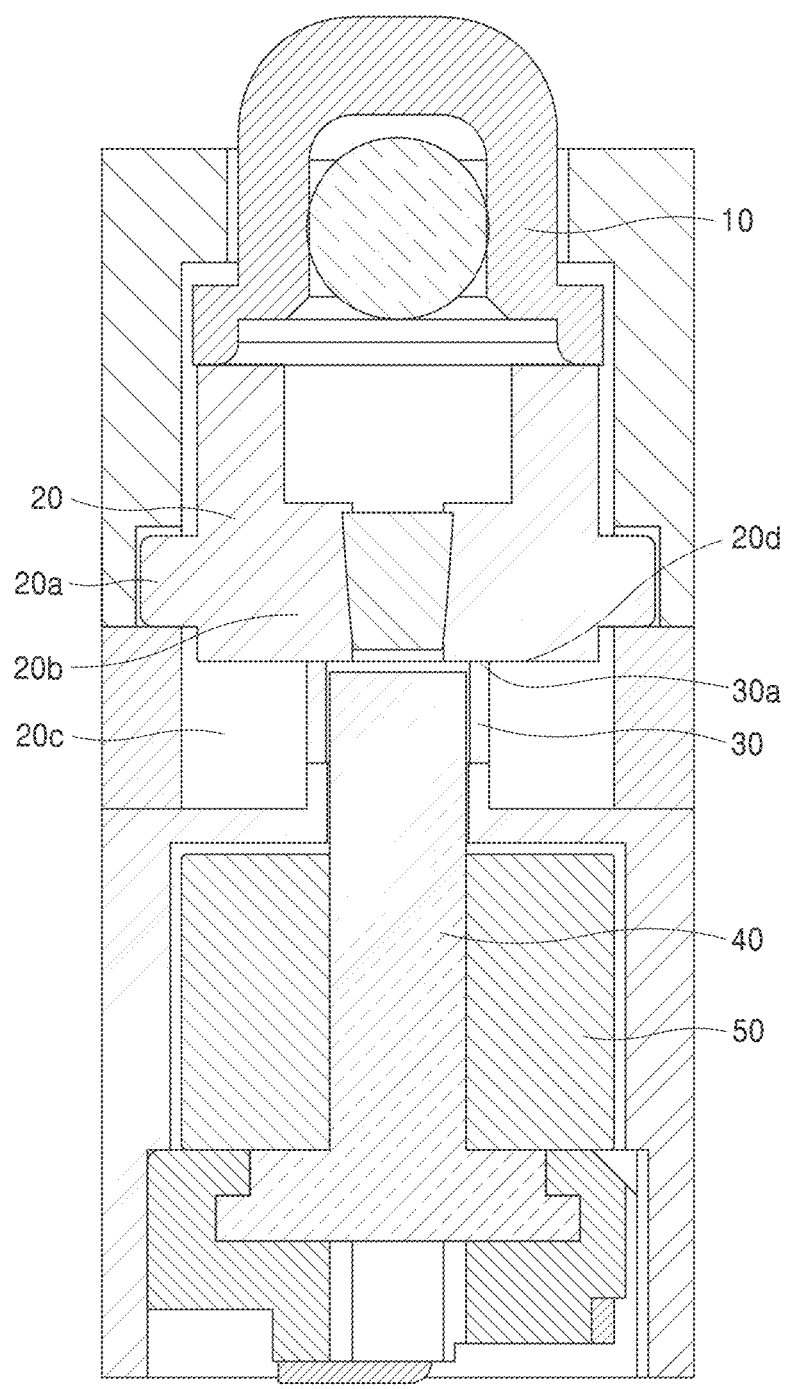

FIG. 19a to FIG. 20b are transparent views schematically showing an information output unit according to another embodiment of the disclosure. FIG. 19A and 19B show sectional views of the information output unit in a pin down state, and 20A and 20B show sectional views of the information output unit in a pin up state.

Referring to FIG. 19a to FIG. 20b, the information output unit IU may comprise a coil 50, a lower housing 31, a middle housing 30, an upper housing 32, a driving unit 20, and a pin 10.

The pin 10 may be moved according to movement of the driving unit 20, that is, may be moved at least in upper and lower directions based on a lengthwise direction thereof.

The pin 10 may include various materials, for example, an insulating material that is light-weight and has an excellent durability. For example, the pin 10 may include a resin-based organic material. In another example, the pin 10 may include an inorganic material such as a ceramic material.

Also, in another alternative embodiment, the pin 10 may include a material such as metal or glass.

The pin 10 may include a magnetic body 10a therein. The pin 10 may be driven through the driving unit 20 more efficiently by using the magnetic body 10a of the pin 10, and the power consumption may be reduced.

For example, the magnetic body 10a may include a metal, and may include iron as a specific example.

As an alternative embodiment a little magnetic force may be generated between the magnetic body 10a and the magnet 20a inside the driving unit 20, and as a specific example, the pin 10 easily descends when the driving unit 20 descends. It is not preferable that such mutual magnetic forces are large enough to limit the motion of the driving unit 20.

For example, it is not desirable that such mutual magnetic force is large enough to maintain the rising position or the falling position of the pin 10.

In addition, the pin 10 may easily descend when the driving unit 20 descends through the weight of the magnetic body 10a.

The coil 50 may be electrically connected to the terminals 710 of the control plate 700 (referring to FIG. 3) through terminals 33a located at a bottom of the lower housing 31. When an electric current flows through the coil 50, a magnetic field may be generated around the coil 50 and/or a core 40.

The driving unit 20 may be moved via the electromagnetic field generated due to the electric current flowing through the coil 50, and a driving force for moving the pin 10 may be provided through the movement of the driving unit 20.

In an alternative embodiment, the core 40 may be further provided, and the coil 50 may be wound around the core 40 and penetrate the lower housing 31 and middle housing 30.

In an alternative embodiment, the core 40 may include a magnetic body, as such, a magnitude of the magnetic field may increase when the magnetic field is generated by the coil 50, and the magnetic field generation may be effectively performed to reduce power consumption of the information output unit IU.

The core 40 may comprise a metal, for example a ferrous material. In an alternative embodiment, the core 40 may comprise nickel and/or cobalt.

In an alternative embodiment, the lower housing 31 and the upper housing 32 may be divided and/or apart from each other.

In another alternative embodiment, the lower housing 31 and the middle housing 30 may be connected to each other via a through hole.

The coil 50 may be arranged in the lower housing 31. In an alternative embodiment, the core 40 may be arranged in the lower housing 31, and a portion of the core 40 may extend into the middle housing 30 via the through hole.

In an alternative embodiment, the housing may include the middle housing 30 between the lower housing 31 and the upper housing 32.

The lower housing 31 and the upper housing 32 may be separated from each other by the middle housing 30.

In an alternative embodiment, the middle housing 30 may have a through hole, through which a portion of the core 40 may extend and pass.

Also, the upper housing 32 includes an entry unit 32a. The pin 10 may move through the entry unit 32a such that a length of the portion protruding out of the upper housing 32 may change.

The driving unit 20 may be arranged in the upper housing 32 and the middle housing 30. The driving unit 20 may be separated from the coil 50 that is in the lower housing 31.

The driving unit 20 is arranged adjacent to the coil 50 and is driven by the electric current flowing through the coil 50 to perform an angular movement or a rotational movement.

In an alternative embodiment a magnet 20a may be arranged in the driving unit 20, for example, in an internal space of the driving unit 20. For example, the magnet 20a may include a magnetic material, for example, a permanent magnet.

The magnet 20a may include a first region (e.g., N-pole or S-pole) and a second region (e.g., S-pole or N-pole) having different polarities from each other, and the first region and the second region having the different polarities from each other may be arranged in a Z-axis direction. The magnet 20a is inclined in a predetermined range, so as to provide the driving unit 20 with a rotation torque. As such, the driving unit 20 is easily rotated if the rotation of the driving unit 20 is started.

The driving unit 20 includes the driving surface 20e on at least an outer surface thereof, and the driving surface 20e is formed to support the pin 10 and provides a driving force to the up-and-down movement of the pin 10.

In an alternative embodiment, the driving surface 20e of the driving unit 20 is an outer surface that may include a curved surface. In more detail, the driving surface 20e of the driving unit 20 may include a boundary line that is formed similarly to a circle.

The driving unit 20 may include a driving controller 20f.

A location of driving the driving unit 20 may be controlled by the driving controller 20f. For example, when the driving unit 20 is moved by the coil 50, the driving unit 20 may perform an angular or rotational movement about the driving controller 20f.

In an alternative embodiment, a central axis of the driving unit 20 and the driving controller 20f may not be coincident, but may be eccentric with respect to each other.

In addition, in an alternative embodiment, the magnet 20a does not coincide with the central axis of the driving unit 20, and may be arranged, for example, to overlap a region of the driving unit 20.

As such, a torque force with respect to the driving unit 20 may be easily generated and allows the driving unit 20 to perform an angular or rotational movement such that a movement relative to the pin 10 may be performed effectively and a precise expression of the information output unit IU may be improved. Also, power consumption of the information output unit IU may be reduced.

For example, during the angular movement of the driving unit 20, once a force is applied only until the driving unit 20 reaches the critical point, the angular movement may be additionally performed even without additional force applied after that point.

The driving controller 20f may be arranged on at least one side surface of the driving unit 20, for example, on each of opposite side surfaces.

In an alternative embodiment, the driving controller 20f may protrude, and the protruding shape of the driving controller 20f in the alternative embodiment may correspond to a driving groove of the upper housing 32.

In the above embodiment, the driving unit 20 retaining the magnet 20a rotates about the rotation shaft (driving controller) 20f in order to transition between the pin down and pin up states.

In the pin 10 down state: The pin down flat stop surface 20c of the retainer portion 20b and the flat stop surface 30a of the middle housing 30 contact each other and the stopping state of the driving unit 20 is held.

In an alternative embodiment, no current may be applied to the coil 50 and/or no substantial amount of magnetic force is applied between the magnet 20a and the core 40 in the pin down state.

And then current is applied to the coil 50 to make the core 40 and/or the coil 50 be an electromagnet. The electromagnet causes repulsive force between the core 40 and/or the coil 50 and the magnet 20a of the driving unit 20 such that the magnet 20a rotates about the driving controller (shaft) 20f in a counterclockwise direction until the flat stop surface 20d of the retainer portion 20b contacts the flat stop surface 30a of the middle housing 30, which causes the driving unit 20 to stop the rotation.

While the driving unit 20 rotates, the driving surface 20e moves the pin 10 up.

In an alternative embodiment, the current applied the coil 50 may not be changed during the rotation of the driving unit 20.

In the pin 10 up state: The flat stop surface 20d of the retainer portion 20b and the flat stop surface 30a of the middle housing 30 contact each other and the stopping state of the driving unit 20 is held.

In an alternative embodiment, no current is applied to the coil 50 in the pin 10 up state, and/or no substantial amount of magnetic force is applied between the magnet 20a and the core 40 in the pin 10 up state.

And then current is applied to the coil 50 to make the core 40 and/or the coil 50 be an electromagnet, and the electromagnet causes repulsive force between the core 40 and/or the coil 50 and the magnet 20a such that the magnet 20a rotates about the driving controller (shaft) 20f in a clockwise direction until the flat stop surface 20c of the retainer portion 20b contacts the flat stop surface 30a of the middle housing 30, which causes the driving unit 20 to stop the rotation.

While the driving unit 20 rotates, the pin 10 moves down along the cam shape profile of the driving surface 20e.

In an alternative embodiment, the current applied the coil 50 may not be changed during the rotation of the driving unit 20.

The above embodiment operates in the pin down state in such a way that the driving unit 20 is held in place by a mechanical structure, i.e., a physical contact between the flat stop surface 20c of the driving unit 20 and the flat stop surface 30a of the middle housing 30. In the pin up state, the driving unit 20 is held in place by the physical contact between the flat stop surface 20d of the driving unit 20 and the flat stop surface 30a of the middle housing 30. Thus, magnetic force for holding the permanent magnet 20a at a position in each of the pin down state or the pin up state is not be required as the flat stop surfaces 20c or 20d and 30a mechanically hold the driving unit 20 in the pin down state and the pin up state.

Further, in the pin down state and the pin up state, no current may be applied, no electromagnetic force may be generated, and/or no substantial amount of the magnetic force exists between the magnet 20a and the any other elements for holding the magnet 20a in place.

The embodiment may be selectively applied to all embodiments of the present disclosure.

As described above, the present disclosure has been described with reference to the illustrated embodiment in the drawings, but this is merely exemplary, and those skilled in the art will understand that various modifications and other equivalent embodiments are possible therefrom. Therefore, the true technical protection scope of the present disclosure should be determined by the technical spirit of the appended claims.

The specific implementations described in the embodiments are examples, and do not limit the scope of the embodiments in any method. For brevity of the specification, descriptions of conventional electronic configurations, control systems, software, and other functional aspects of the systems may be omitted. In addition, since the connection of the lines between the components or connection members shown in the drawings are illustrative examples of functional connections and/or physical or circuit connections, in the actual device, it may be represented as an alternative or additional various functional connections, physical connections, and circuit connections. In addition, unless "essential", "important", etc. are not specifically mentioned, it may not be a necessary component for the application of the present disclosure.

In the specification (especially in the claims) of the embodiments, the use of the term "the" and similar indicating terms may correspond to both singular and plural. In addition, in the case where a range is described in the embodiment, since it includes the disclosure in which the individual values belonging to the range are applied, unless otherwise stated, it is the same as describing each individual value constituting the range in the detailed description. Finally, when there is no explicit or contradictory description of steps constituting the method according to the embodiment, the steps may be performed in a suitable order. The embodiments are not necessarily limited to the order in which the steps are described. The use of all the examples or exemplary terms (for example, etc.) in the embodiments is merely for describing the embodiments in detail. Accordingly, the scope of the embodiments may not be limited by the examples or exemplary terms, unless limited by the claims. In addition, those skilled in the art may recognize that various modifications, combinations, and changes may be configured according to design conditions and factors within the scope of the appended claims or equivalents thereof.

What is claimed is:

1. An information output apparatus comprising:
   at least one unit block module each including a plurality of expression holes, at least one first fastening part and at least one second fastening part configured to be coupled to the at least one first fastening part;
   a plurality of pins located in each of the at least one unit block module and configured to move to be exposed through the plurality of expression holes;
   a plurality of activation modules located in each of the at least one unit block module and configured to move the plurality of pins, each of the plurality of activation modules including a coil;
   a control panel coupled to the at least one unit block module and including a plurality of terminals electrically connected to the coil of each of the plurality of activation modules; and
   a control module electrically connected to the plurality of terminals and configured to control an operation of each of the plurality of activation modules,
   wherein each of the plurality of activation modules includes:
      a driving unit including a coil shaft and the coil wound around the coil shaft; and
      a moving unit placed between the driving unit and a corresponding one of the pins, including a magnetic member having a first polarity and a second polarity, the moving unit being rotatably provided,
   wherein the coil shaft and the coil are fixed and not moved,
   wherein the magnetic member is configured to be rotated by magnetic field formed by the coil, and
   wherein the moving unit is configured to be rotated by the rotation of the magnetic member and move the corresponding pin by the rotation thereof.

2. The information output apparatus of claim 1, wherein the at least one unit block module includes a first unit block module and a second unit block module adjacent to each other, wherein a first fastening part of the first unit block module and a second fastening part of the second unit block module are coupled, and wherein the first unit block module and the second unit block module are coupled to the control panel.

3. The information output apparatus of claim 1, wherein each of the at least one unit block module includes a housing having a first surface, a second surface and a third surface facing in different directions,
   wherein the plurality of expression holes are located on the first surface, wherein the first fastening part is located on the second surface, and wherein the second fastening part is located on the third surface.

4. The information output apparatus of claim 1, further comprising a partition wall positioned between the driving unit and the moving unit.

5. The information output apparatus of claim 1, wherein the magnetic member is disposed at a position spaced apart from a center of the moving unit.

6. The information output apparatus of claim 1, wherein a rotation center of the moving unit is arranged to be spaced apart from a center of the moving unit.

7. The information output apparatus of claim 1, wherein a rotation center of the moving unit is movable.

8. The information output apparatus of claim 1, wherein the driving unit further includes a support projecting toward the moving unit.

9. An information output apparatus comprising:
   a plurality of unit block modules each including a plurality of expression holes and a housing;
   a plurality of pins located in the housing and configured to move to be exposed through the plurality of expression holes;
   a plurality of activation modules located in the housing, configured to move the plurality of pins, each of the activation modules comprising a moving unit having a magnetic member, a coil shaft, and a coil wound around the coil shaft;
   a control panel coupled to the unit block modules and including a plurality of terminals electrically connected to the coil of each of the plurality of activation modules; and
   a control module electrically connected to the plurality of terminals and configured to control an operation of each of the plurality of activation modules,
   wherein the housing comprises a first housing and a second housing coupled to each other, the first housing faces the expression holes and the second housing is coupled to the control panel,
   wherein the housing includes at least one first fastening part and at least one second fastening part configured to be coupled to the first fastening part of an adjacent unit block module,
   wherein the coil shaft and the coil are fixed in the housing, and
   wherein the moving unit is configured to move a corresponding one of the pins linearly by using of a rotating movement of the magnetic member, the rotating movement of the magnetic member being formed by magnetic field of the coil.

10. The information output apparatus of claim 9, further comprising a partition wall positioned between the coil and the moving unit.

11. The information output apparatus of claim 9, wherein the magnetic member is disposed at a position spaced apart from a center of the moving unit.

12. The information output apparatus of claim 9, wherein a rotation center of the moving unit is arranged to be spaced apart from a center of the moving unit.

13. The information output apparatus of claim 9, wherein a rotation center of the moving unit is movable.

14. The information output apparatus of claim 9, further comprising a driving unit including the coil and the coil shaft, wherein the driving unit further includes a support projecting toward the moving unit.

15. The information output apparatus of claim 14, wherein the support is coupled to the coil shaft.

16. The information output apparatus of claim 9, wherein the moving unit is not electrically connected to the control module.

17. The information output apparatus of claim 9, wherein the corresponding pin is in contact with the moving unit.

18. The information output apparatus of claim 9, wherein the coil shaft extends in a first direction, and
   wherein the magnetic member has a first polarity and a second polarity, and the first polarity and the second polarity are formed along the first direction.

* * * * *